United States Patent [19]

Brown, Jr.

[11] Patent Number: 4,536,008
[45] Date of Patent: Aug. 20, 1985

[54] VEHICLE SAFETY RESTRAINT DEVICE

[76] Inventor: Milton F. Brown, Jr., 1105 Hartwood Ave., Virginia Beach, Va. 23454

[21] Appl. No.: 576,791

[22] Filed: Feb. 6, 1984

Related U.S. Application Data

[63] Continuation of Ser. No. 383,001, May 28, 1982, abandoned, which is a continuation of Ser. No. 228,584, Jan. 26, 1981, abandoned, which is a continuation of Ser. No. 921,085, Jun. 30, 1978, abandoned.

[51] Int. Cl.³ .............................................. B60R 21/08
[52] U.S. Cl. .................................... 280/730; 280/736; 280/743
[58] Field of Search ............... 280/730, 728, 738, 736, 280/737, 743, 753, 749; 296/97 B, 975

[56] References Cited

U.S. PATENT DOCUMENTS

| | | | |
|---|---|---|---|
| 2,806,737 | 9/1957 | Maxwell | 280/730 |
| 2,834,606 | 5/1978 | Bertrand | 280/730 |
| 3,664,682 | 5/1972 | Wycech | 280/730 |
| 3,715,130 | 2/1973 | Harada et al. | 280/738 |
| 3,791,476 | 2/1974 | Wernig | 280/753 |
| 3,792,873 | 2/1974 | Buchner et al. | 280/743 |
| 3,883,154 | 5/1975 | McCullough | 280/738 |
| 4,076,277 | 2/1978 | Kuwakado et al. | 280/738 |
| 4,130,298 | 12/1978 | Shaunessey | 280/730 |

FOREIGN PATENT DOCUMENTS

| | | | |
|---|---|---|---|
| 1392677 | 2/1965 | France | 280/728 |
| 2238343 | 2/1975 | France | 280/730 |

Primary Examiner—David M. Mitchell
Attorney, Agent, or Firm—John B. Dickman, III

[57] ABSTRACT

A vehicle safety restraint device is disclosed which comprises an airbag and projectable lap plate attached to rotatably mounted transverse tubes containing compressed gas or chemical inflator cartridges, all of which are housed within a container capable of being used as a visor when in an inoperative condition. An electrical impulse from an impact sensing or emergency hand switch releases the unit to rotate into a vertical position, simultaneously inflating the airbag through telescoping tubes within the bag and projecting the lap plate into the occupant's lap.

7 Claims, 14 Drawing Figures

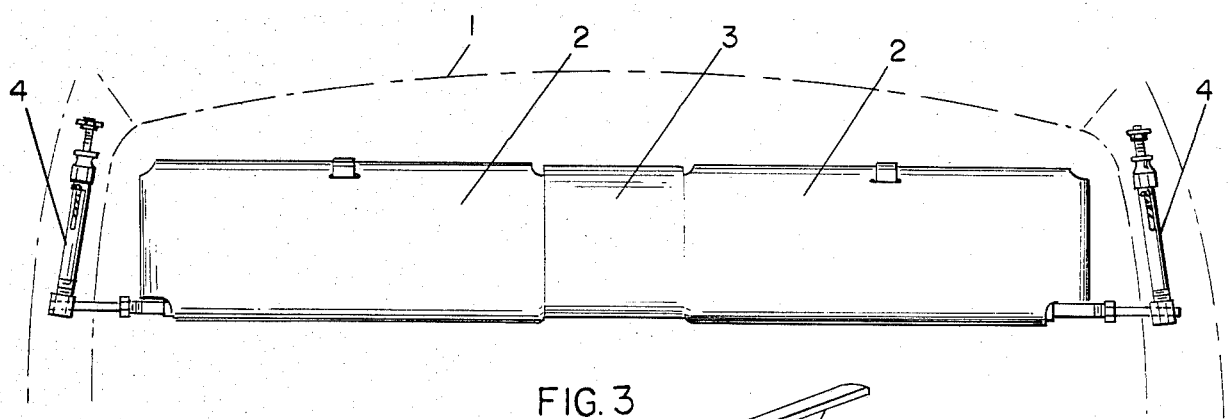
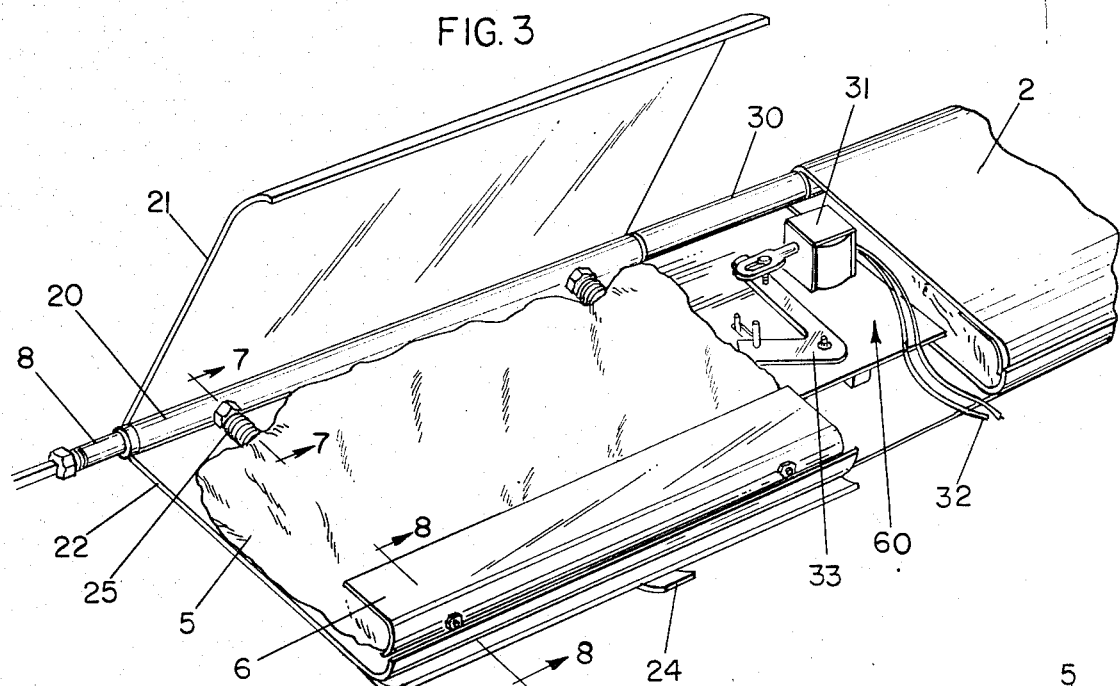
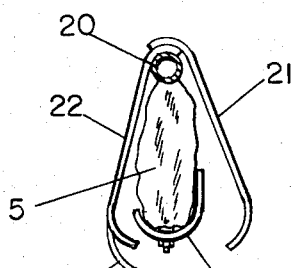
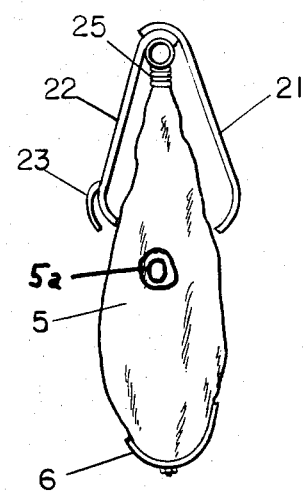
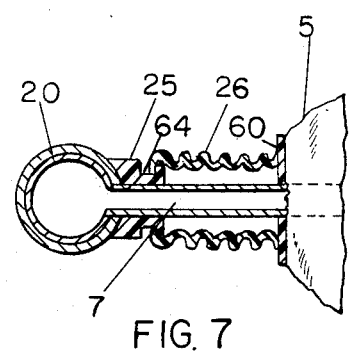
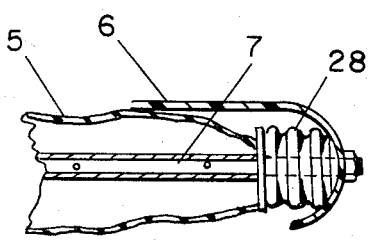

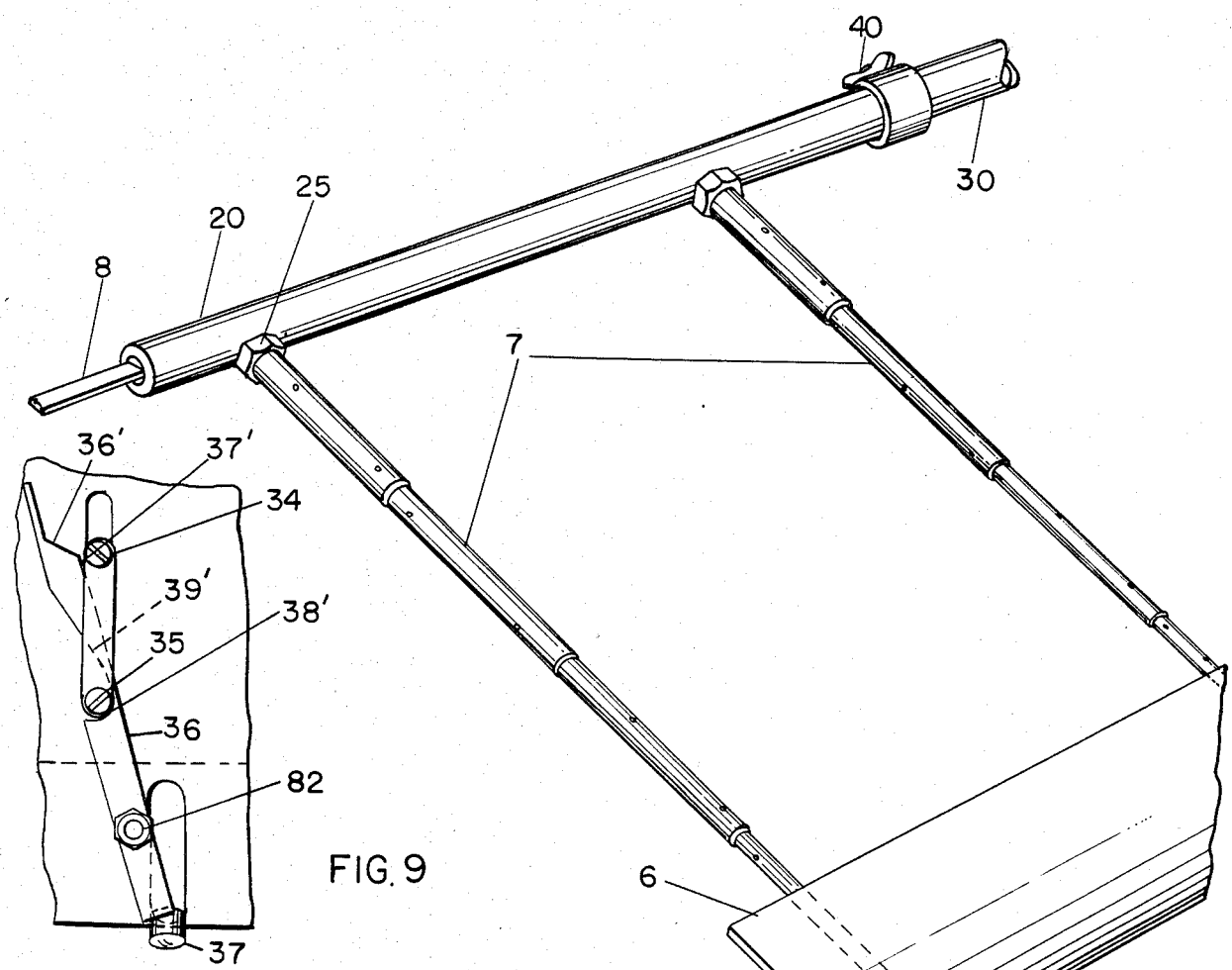
FIG. 9
FIG. 14
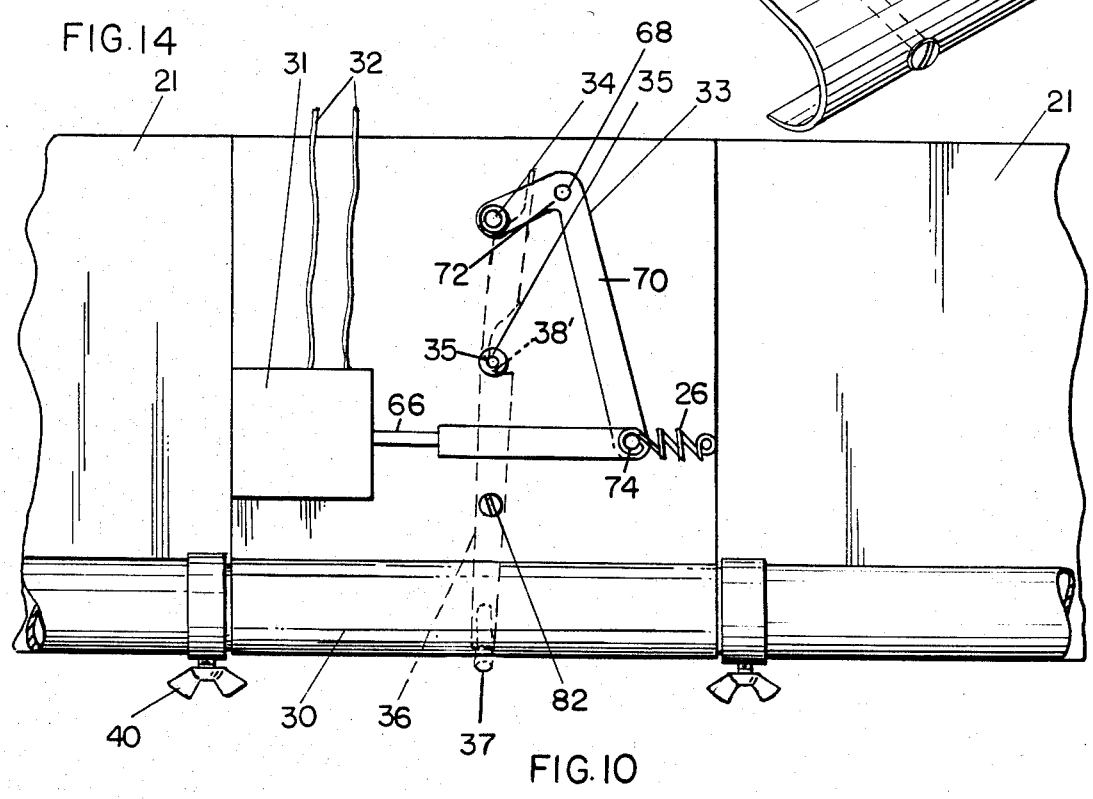
FIG. 10

VEHICLE SAFETY RESTRAINT DEVICE

This application is a continuation of Ser. No. 383,001, filed May 28, 1982, which was a continuation of Ser. No. 228,584, filed Jan. 26, 1981, which was a continuation of Ser. No. 921,085, filed June 30, 1978, all now abandoned.

BACKGROUND OF THE INVENTION

This invention relates to a vehicle restraint device for protecting occupants of a vehicle against injuries which would otherwise be suffered because of rapid deceleration of a vehicle as by a collision.

When a vehicle is involved in an accident, there is a probability that the occupant will be thrown forward violently, striking the windshield or some other part of the vehicle, thereby sustaining injuries. In recent years several public interest groups and the Federal Government have pushed for some type of safety restraint system which could protect the occupant against such injuries and it is currently expected that all vehicles, starting with the 1981 model year will be required to incorporate such restraint devices.

Conventional inflatable occupant restraint devices are mounted in various places in a vehicle, such as the dashboard, horn hub, the front seat back and the roof, and are inflated upon an impact above a predetermined magnitude.

One occupant restraint device is described in U.S. Pat. No. 3,774,936, Barnett et al, where a roof mounted inflatable cushion is located at a predetermined position above and in front of a seated passenger. The system provides a rearward and downward restraining force and provides a cushioned barrier for the passenger through the use of a roof installed pulley and continuous loop cable system.

Another type of roof mounted airbag system is disclosed in U.S. Pat. No. 2,834,606, Bertrand, for protecting passengers from being thrown against non-yielding parts of the vehicle. Upon impact the entire passenger compartment is filled with inflated airbags released from overhead, beneath the dashboard, from the back of the front seat and from doors.

Other roof mounted restraint devices are disclosed in U.S. Pat. No. 3,664,682, Wyceck, consisting of a rotatably mounted cushion and airbag inflated by tubing from an air pressure chamber, U.S. Pat. No. 3,753,576, Gorman, consisting of a system positioned behind the occupant which upon release curves over the occupant and encapsulates him within an airbag and an outer shield, and U.S. Pat. No. 3,836,168, Nonaka, which projects a net or cloth from behind to a position in front of the occupant from whence it is drawn downwardly and rearwardly by cables located within the back of the seat.

It is the primary object of the present invention to provide a safety device for the protection of an occupant when a vehicle is involved in a collision.

A further object is to provide a system of this type which is unobtrusive.

A still further object is to provide a safety restraint device which includes a protective airbag barrier and a pelvic and torso engaging restraint to restrain forward and upward motion of the occupant in case of an accident.

Other objects and advantages of the invention will be apparent from the following description.

SUMMARY OF THE INVENTION

The present invention provides an occupant restraint device for protecting the occupant of a vehicle in the event of a collision, said device comprising;

a. a confining means adapted in use for confining a vehicle occupant in close proximity to a seat, the confining means being housed in a container rotatably mounted to the vehicle roof;

b. the confining means including an airbag with internal telescoping tubes extending through the airbag and attaching to a restraining pelvic and torso engaging means which upon projection from the container are positioned in front of the occupant and provide rearward and downward force;

c. a sensing means adapted to actuate a gas releasing or generating means upon detecting an impact.

DETAILED DESCRIPTION OF THE INVENTION

The present invention will now be described with reference to the accompanying drawings in which:

FIG. 3 is a cutaway view of an automobile from above showing the safety restraint device of this invention as installed;

FIG. 4 is a partial perspective view of the safety restraint device,

FIG. 5 is a side view of the safety restraint device at the commencement of extension and inflation;

FIG. 6 is a side view of the safety restraint device after full extension and partial inflation;

FIG. 7 is a sectional view taken along line 7—7 of FIG. 4;

FIG. 8 is a sectional view taken along line 8—8 of FIG. 4;

FIG. 9 is a perspective view of the telescoping tubes and lap plate of this invention;

FIG. 10 is a top plan view of the center lock and release unit of the safety restraint device;

FIG. 14 is a plan view of one type of spring latch 36 showing the depressions and camming surfaces thereon.

DESCRIPTION OF THE PREFERRED EMBODIMENT

Figure 1:
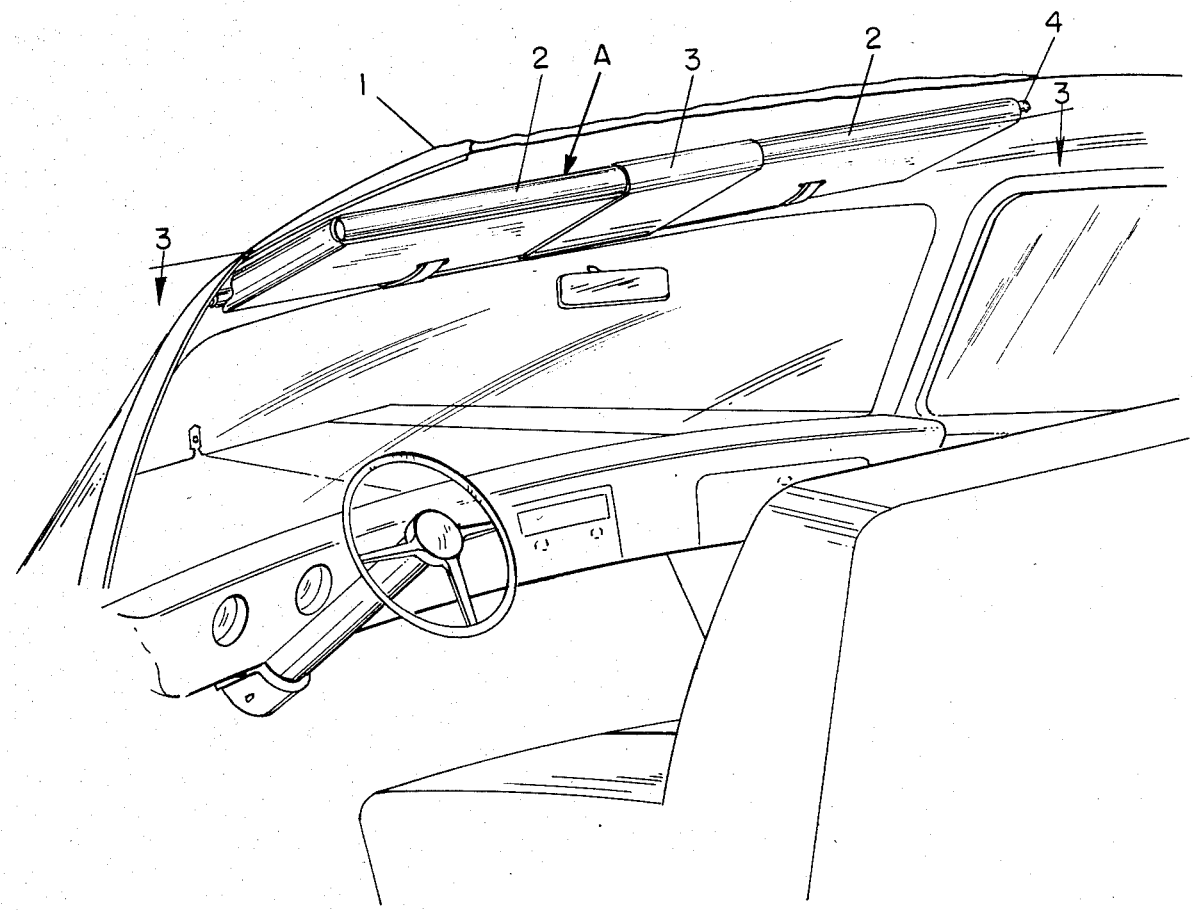
FIG. 1 is a perspective view of the front interior of an automobile showing the safety restraint device of this invention.
Figure 2:
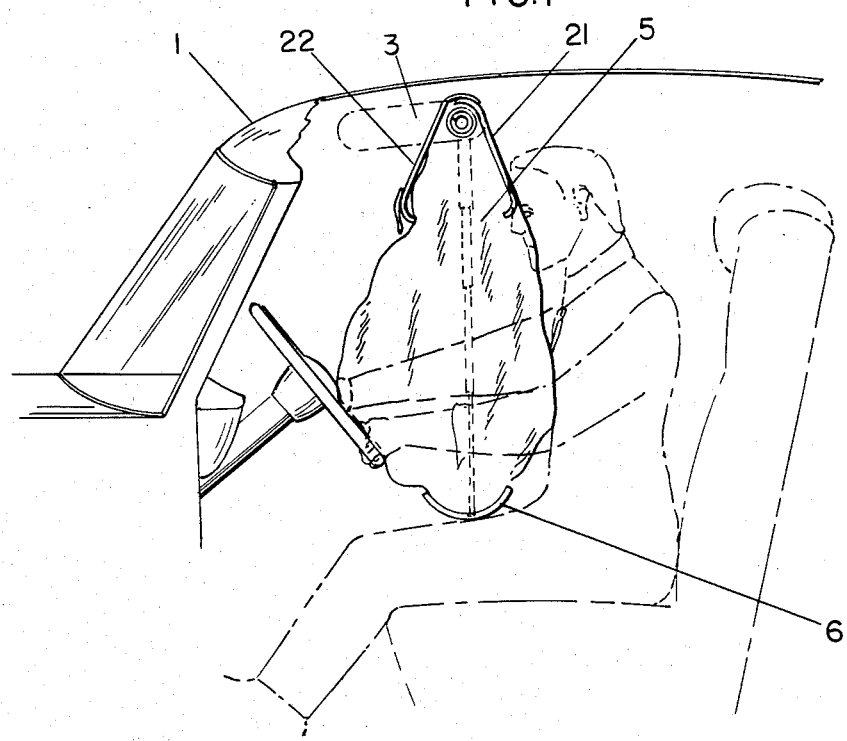
FIG. 2 is a side cutaway view of an automobile showing the safety restraint device of this invention after extension and inflation.

Referring to the drawings, FIGS. 1 and 2 show the vehicle safety restraint device A mounted in close proximity to the roof or overhead of a vehicle 1. There are two container units 2 connected to a center console unit 3. The safety restraint device is attached to the automobile by center console unit 3 located along the longitudinal center line of the vehicle and side holding members 4 located on each side of the vehicle and best shown on FIG. 3. The center console 3 and holding members 4 have absorption springs, not shown, to provide for limited forward movement upon impact.

In FIG. 2 the safety restraint device is shown in an activated position with an airbag 5 in front of the occupant and an extended lap plate 6 pushing down and back, restraining forward and upward movement by the occupant.

The airbag 5 is best shown in FIGS. 4-6. Each container unit 2 includes a top 21, which may be semi-flexible or have a padded exterior, and a bottom 22. The top 21 and the bottom 22 are held in a closed position by a clasp 23 and a latch 24 located on one end and having a rotatable attachment to a transverse tube 20 at the opposite end. FIG. 5 shows the container 2 partly open and the airbag in a deflated position. In FIG. 6, the container 2 is open, the airbag is partially inflated and lap plate 6 is fully extended.

Turning again to FIG. 4, the cover of the center console has been removed to show the safety restraint activating unit. Center tube 30 contains a concealed torsion spring 38, shown in FIG. 11, which is released to rotate by electro-mechanical control system 60. A solenoid 31 is connected by leads 32 to an impact sensing switch which is mounted in the front end of the vehicle, and, if desired, to an emergency manual switch mounted on the dashboard. An electrical impulse to solenoid 31 operates the release lever 33, discussed in detail later on.

FIGS. 7 and 8 show the connection of airbag 5 and telescoping tube 7 to transverse tube 20 on one end and to lap plate 6 on the opposite end. FIG. 7 shows transverse tube 20 with a telescopic tube and bag attachment piece 25. A telescopic tube 7 made of metal or plastic is fitted within and attached to attachment piece 25, which may be welded or otherwise fastened and sealed to transverse tube 20. Airbag 5 is slipped over the telescoping tube 7 and fastened around the outer surface of attachment piece 25 by means of flexible tube 26, which may be an integral part of the airbag or attached and sealed to the airbag. FIG. 8 shows a lap plate attachment piece 28 into which the free end of the telescoping tube 7 is fitted. The other end of airbag 5 is similarly attached by flexible tubing around lap plate end piece 28. Lap plate end piece 28 may be an integral part of lap plate 6 or otherwise attached by well known means. The lap plate 6 is a "J" shaped piece of rigid plastic or metal with rounded turn-ins on each end. When extended, lap plate 6 extends laterally across approximately one half of the vehicle seat. The lap plate 6 may be made of two or more slidably interlocking pieces which extend to greater width upon extension of telescoping tubes arranged on a diverging angle or by expanding force by closely placed airbags 5.

FIG. 9 shows the transverse tube 20 with attached and extended telescoping tubes 7 and attached lap plate 6 with surrounding airbags 5 removed. Perforations in the walls of telescoping tubes 7 permit rapid release of gas released within transverse tube 20 upon extension of telescoping tubes 7. The rapidity of extension before airbag inflation can be controlled and varied by the selection of telescoping tube segments which are perforated and the size of the perforations. Further, the degree of resistance to upward movement by lap plate 6 may be varied by such location of the perforations. For example, the location of the perforations in the smallest and innermost segment of the telescoping tube results in the most rapid extension and greatest resistance to upward movement. When pyrotechnic chemicals are used as inflators, a longer passage for the hot gases is necessary to avoid damage to the surrounding airbag.

FIGS. 10-13 are directed to the locking and release mechanism of the safety restraint device A. FIG. 10 shows the solenoid 31 and the electrical leads 32, which connect to the impact sensor, not shown. Solenoid 31 has a retractable rod 66 which connects to release lever 33. Release lever 33 is pivotally connected to center console 3 by pivot pin 68. The lever arm 33 has a long arm 70 and a short arm 72. Solenoid rod 66 is connected to the long arm 70 by engaging pin 74. Holding the solenoid rod 66 in the extended position is a spring 76 which yields when the solenoid is actuated. Short arm 72 engages a slidably mounted locking pin 34 which locks latch 36 in a closed position against center tube lug 37, thereby preventing the rotation of center tube 30 by torsion springs within tube 30. Movement of short arm 72 moves locking pin 34 in a depression 36' located in the rearward end of latch 36 and simultaneously pulls a connected push pin 35 against an increasing angle on the side of latch 36, giving latch 36 a turning movement. Latch 36 pivots about pivot pin 82 in console 3. The simultaneous unlocking movement of pin 34 and turning force of push pin 35 applied to latch 36 releases tube lug 37 which is dynamically balanced against the end of latch 36. Center tube lug 37 upon release rotates through an angle of ninety degrees before striking a stop in center console 3. Torsion springs 38 contained within center console spring tube 30 provide the rotational force to tube lug 37.

FIG. 14 is a plan view of one type of spring latch 36 showing the depression 36' and the camming surface 37'. On the opposite surface of the spring latch 36 is another depression 38' and a camming surface 39'. The latch 36 rotates about pivot pin 82.

Figure 11:
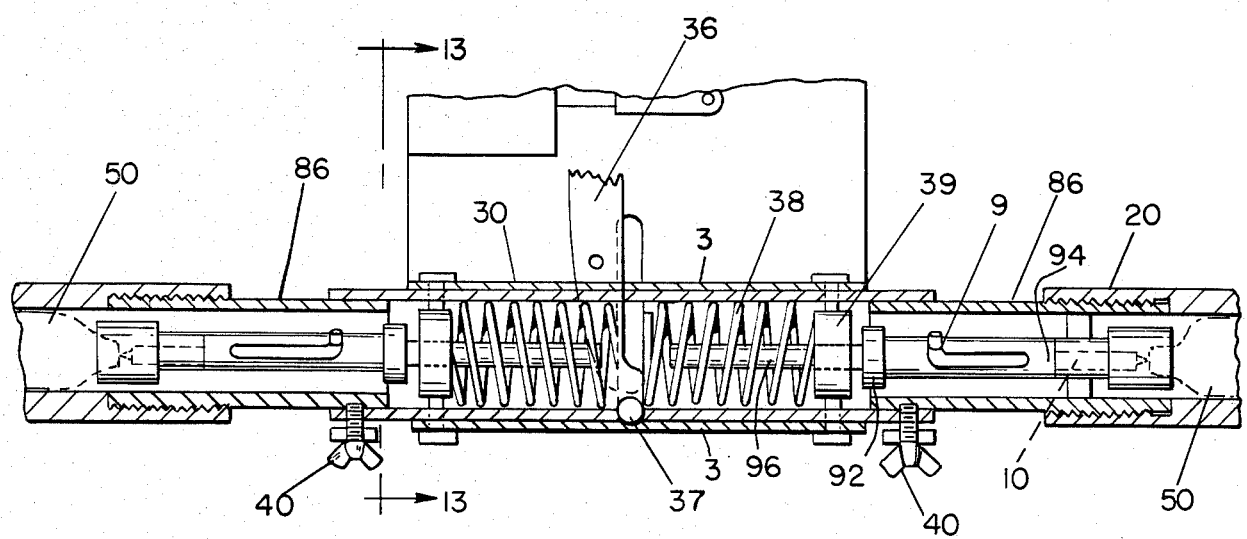
FIG. 11 is a sectional view of the center unit lock and gas releasing or generating system of the safety restraint device of this invention.
Figure 12:
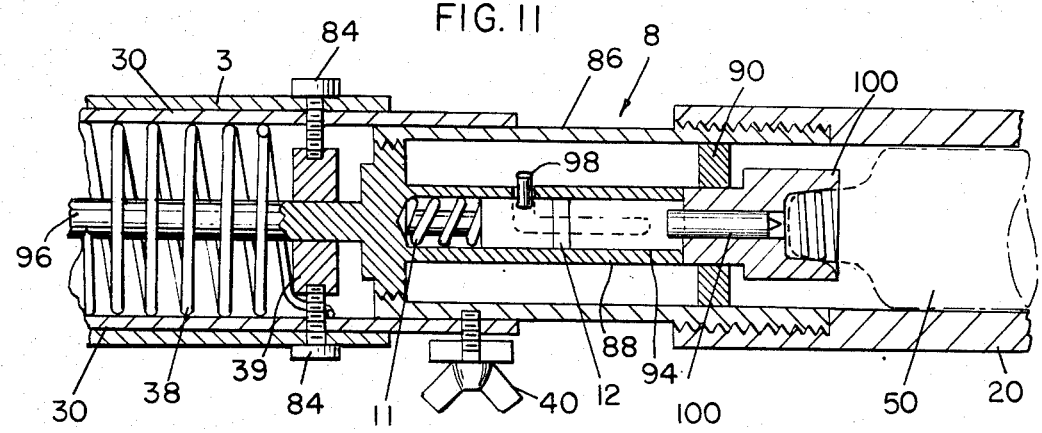
FIG. 12 is a sectional view of the gas releasing or generating system of the safety restraint device.

As shown in FIGS. 11 and 12, torsion springs 38 contained within center console spring tube 30 are attached at one end to tube lug 37 at the center of tube 30 and to slotted inserts 39 at each end of spring tube 30. The rotation of center console spring tube 30 through an angle of ninety degrees also rotates containers 2 which are connected to tube 30. Such rotation of containers 2 beyond a predetermined angle below the horizontal serves to activate airbags 5 and extend telescoping tubes 7 and lap plate 6 by means of a firing assembly 8 on the end of container 2, as will be more fully explained later.

Figure 13:
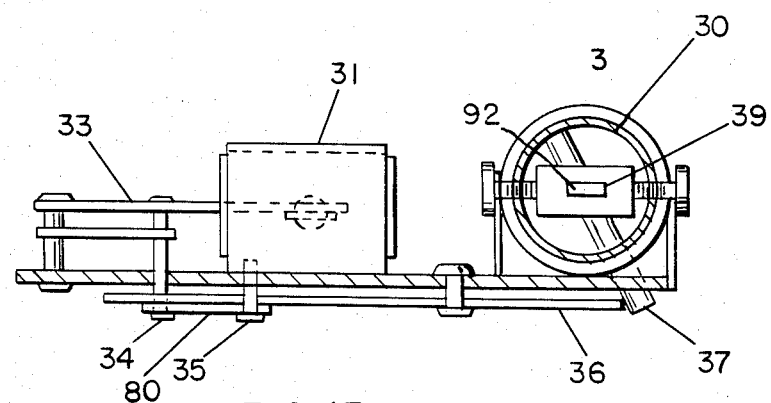
FIG. 13 is a sectional view taken along line 13—13 of FIG. 11 showing the center lock and actuating unit of the invention.

As shown in FIG. 13, center console spring tube end pieces 39 are slotted and are mounted within center console tube 30 by bolts 84 running through annular slots in tube 30 and fixed to flanges of center console 3. Slotted end pieces 39 are held in a fixed horizontal plane during rotation of center console spring tube 30. The slots in end pieces 39 receive and hold firing pin rod flat end 92, extending from firing assembly 8, in a laterally slidable horizontal plane. (See FIG. 12)

FIGS. 11 and 12 show firing assembly 8 which is attached into the end of transverse tube 20 of the container 2. The outer end of firing assembly 8 is slipped into center console spring tube 30 and held in position in a vertical plane within tube 30 by friction screw 40 which engages an annular slot or groove in wall of outer tube 86 of firing assembly 8. Such groove in outer tube 86 permits rotation of containers 2 through an angle of 55 degrees relative to center console spring tube 30, thereby permitting container 2 to be used as a visor. When containers 2 are in a position from one to fifty five degrees below a horizontal plane, rotation of center console spring tube 30 will continue the rotation of container 2 to an approximately vertical position and activating the firing assembly when containers 2 have moved beyond the predetermined angle.

Firing assembly 8 consists of an outer tube 86, an inner tube rod and firing pin holding assembly 88, a rod with a flanged inner end 12 serves as a hammer. A flat outer end 92 engages a slotted center console spring tube end piece 39, and a rod lug 98 moves within the pattern of an L shaped slot in inner tube 94, there is a compression spring 11, an outwardly tapering firing pin 10, and an annular inner tube support ring 90 and a firing pin and cartridge holder 100. A CO2 or pyrotechnic chemical cartridge is screwed into threads in the end of firing pin and cartridge holder 100 and holder 100 is screwed into threads inside tube 94 of inner tube assembly 88. Inner tube assembly 88 is fitted within outer tube 86 and annular support 90. Outer tube 86 is screwed or otherwise locked and sealed in the end of transverse tube 20 which receives and holds cartridges 50. Upon rotation of center console spring tube 30, firing assembly 8 attached within tube 30 is rotated around rod 96, the flat end 92 of which is held in a horizontal plane by center console spring tube 39. Rotation of firing assembly 8 beyond a fifty five degree angle releases rod lug 98 to move laterally within slot 9 under force supplied by compression spring 11. The flanged hammer end 12 of rod 96 strikes the protruding end of firing pin 10, driving it against and piercing or detonating cartridge 50 within transverse tube 20. The released or generated gases from cartridge 50 drive firing pin 10 back into a locked and sealed position, thereby permitting the gases to escape only into telescoping tubes 7 and surrounding airbags 5.

In operation, a signal from the impact sensor activates solenoid 31, which pivots release lever 33, moving torsion spring latch 36. The torsion spring lug 37 which is held in a static energy position by latch 36 is freed to rotate 90 degrees upon movement of latch 36. Rotation of torsion spring lug 37 also rotates center console spring tube 30 and containers 2 connected to spring tube 30 by firing assembly 8, as described. When the firing assembly 8 and containers 2 are moved more than 55 degrees, firing assembly 8 is activated, thereby piercing or detonating cartridge 50 within transverse tube 20 of containers 2. Gases from cartridge 50 escape into telescoping tubes 7, extending the tubes and passing through apertures in the tubes 7 into airbags 5, inflating said airbags. The extending force of telescoping tubes 7 and lap plate 6, and the expanding force of airbags 5 press open containers 21 and 22, overriding clasp 23 and latch 24. (FIG. 4) The rotation, extension and expansion movement of safety restraint device "A" places it in a position between the occupant and the forward fixed elements of the vehicle and provides a positive downward hold by lap plate 6 on the pelvic and lower abdomen to prevent forward or upward violent movement. In case an adult occupant's forehead is forced forward by the impact against the padded or semi-flexible top cover 21, the top cover is driven against the upper end of airbag 5, absorbing energy from the forward force. In high speed accidents the entire safety restraint device A will move forward for a distance of one to two inches under heavy impact, restrained by means of springs or compressible material attached to center console 3 and end holding pieces 4. Where 2 or more airbags are used and interconnected through tranverse tube 20, the force of the body against one airbag 5 is partially transferred to and absorbed by another airbag 5. Further, the force of the body against airbag 5 results in further extension of telescoping tubes 7 and lap plate 6, providing a greater hold down pressure and absorbing a part of the energy. Such transfer of loads enables the use of lighter airbag material to absorb energy without rupture. In use, airbag 5 may contain one or more flapper valves 5a (see FIG. 6) along one or both sides. Such valves enable the intake of air upon rapid extension of the bag by telescoping tubes 7, sealing the bag upon inflation, and release of pressure from all interconnected airbags upon depression of the flapper valve by the occupant or rescue personnel.

While only one embodiment of the invention is shown, various changes and modifications may be made without departing from the spirit of the invention, therefore the invention should be defined by the following claims;

What is claimed is:

1. A confining means adapted in use for confining the upward and forward movements of an occupant of a vehicle, a housing means mounted to the interior overhead of a vehicle for containing said confining means, an actuating means adapted to release said confining means from said housing means, said confining means including at least one airbag and at least one torso and pelvic engaging safety restraint, said housing means including top and bottom covers which open upon application of an extending or expanding force or both, said housing being mounted on a rotatable means, said rotatable means being hollow and connected to said airbag and torso engaging restraint, said actuating means rotating the confinement means when actuating same and causes the release of same from said housing means to deploy the airbag and torso and pelvic restraint adjacent the occupant.

2. The safety restraint of claim 1 wherein said rotatable means is a transverse tube.

3. The safety restraint of claim 2 wherein said torso and pelvic engaging means is at least one telescoping means with a torso and pelvic engaging end.

4. The safety restraint of claim 3 wherein the telescoping means is inserted into a surrounding airbag.

5. The safety restraint of claim 4 having a firing assembly means for piercing compressed gas or detonating pyrotechnic chemical cartridges with a tapered firing pin for inflating said airbag, said firing pin being driven into a locked and sealed position by escaping gases.

6. The safety restraint of claim 5 wherein said firing assembly means is actuated by the movement of said actuating means when rotating said rotatable means.

7. An airbag inflation and extension device as set forth in claim 6, comprising a source of compressed gas or chemical inflator, a telescoping tube connected to said source and an airbag surrounding said telescoping tube, said telescoping tube extending upon release of source gases and inflating the surrounding bag.

* * * * *